(12) United States Patent
Lin et al.

(10) Patent No.: US 9,479,705 B2
(45) Date of Patent: Oct. 25, 2016

(54) EXPOSURE VALUE ADJUSTMENT APPARATUS, METHOD, AND NON-TRANSITORY TANGIBLE MACHINE-READABLE MEDIUM THEREOF

(71) Applicant: HTC Corporation, Taoyuan, Taoyuan County (TW)

(72) Inventors: Chia Yen Michael Lin, Taoyuan (TW); Jing-Lung Wu, Taoyuan (TW); Hsin-Ti Chueh, Taoyuan (TW); Yu-Cheng Hsu, Taoyuan (TW); Hung-Chih Yang, Taoyuan (TW); Li-Chun Hsu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 277 days.

(21) Appl. No.: 13/762,465

(22) Filed: Feb. 8, 2013

(65) Prior Publication Data

US 2013/0208139 A1 Aug. 15, 2013

Related U.S. Application Data

(60) Provisional application No. 61/597,845, filed on Feb. 13, 2012, provisional application No. 61/602,648, filed on Feb. 24, 2012.

(51) Int. Cl.
*H04N 5/235* (2006.01)
*G06T 5/50* (2006.01)
*G06T 5/00* (2006.01)
*G06T 5/40* (2006.01)

(52) U.S. Cl.
CPC ............ *H04N 5/235* (2013.01); *G06T 5/009* (2013.01); *G06T 5/40* (2013.01); *G06T 5/50* (2013.01); *G06T 2200/21* (2013.01); *G06T 2207/10016* (2013.01); *G06T 2207/20008* (2013.01); *G06T 2207/20221* (2013.01)

(58) Field of Classification Search
CPC .... H04N 5/235; H04N 5/2351; G06T 5/007; G06T 5/40; G06T 5/50; G06T 5/009; G06T 2207/10016; G06T 2207/20221; G06T 2207/20008; G06T 2200/21
USPC .......... 348/208.12, 222.1, 229.1, 230.1, 234, 348/235, 236, 255, 361, 36, 2, 363, 364, 348/365, 366, 367, 368; 382/168, 169, 170, 382/171, 172, 173, 174, 254, 270, 271, 272, 382/273, 274
See application file for complete search history.

(56) References Cited

U.S. PATENT DOCUMENTS 5,194,960 A * 3/1993 Ota ...................... H04N 5/2351
348/224.1
2004/0184673 A1* 9/2004 Watanabe ............... G06T 5/009
382/274

(Continued)

FOREIGN PATENT DOCUMENTS

| CN | 101394487 A | 3/2009 |
| CN | 101399924 A | 4/2009 |
| CN | 101582991 A | 11/2009 |

OTHER PUBLICATIONS

Office Action issued in corresponding China application on Aug. 4, 2015 (and its English translation).

*Primary Examiner* — Twyler Haskins
*Assistant Examiner* — Peter Chon
(74) *Attorney, Agent, or Firm* — McClure, Qualey & Rodack, LLP (57) ABSTRACT

An exposure value adjustment apparatus, method, and non-transitory tangible machine-readable medium thereof are provided. The exposure value adjustment apparatus includes a camera module and a processor. The camera module captures a reference image by a base exposure value. The processor generates a histogram of the reference image, divides the histogram into a low partial histogram, a middle partial histogram, and a high partial histogram by a first threshold and a second threshold, decides a high exposure value according to the low partial histogram and the middle partial histogram, decides a low exposure value according to the high partial histogram and the middle partial histogram, and decides a middle exposure value according to the high exposure value and the low exposure value. The low exposure value is lower than the high exposure value, and the middle exposure value is between the high exposure value and the low exposure value.

22 Claims, 8 Drawing Sheets

(56) References Cited

U.S. PATENT DOCUMENTS

| | | |
|---|---|---|
| 2005/0254723 A1 | 11/2005 | Wu |
| 2007/0081721 A1* | 4/2007 | Xiao .................. G06T 5/009 |
| | | 382/167 |
| 2010/0103194 A1 | 4/2010 | Chen et al. |
| 2011/0013048 A1 | 1/2011 | Wei et al. |
| 2011/0157425 A1* | 6/2011 | Nakayama ......... H04N 5/23245 |
| | | 348/234 |

* cited by examiner

EXPOSURE VALUE ADJUSTMENT APPARATUS, METHOD, AND NON-TRANSITORY TANGIBLE MACHINE-READABLE MEDIUM THEREOF

This application claims the benefit of U.S. Provisional Application Ser. No. 61/597,845 filed on Feb. 13, 2012 and U.S. Provisional Application Ser. No. 61/602,648 filed on Feb. 24, 2012.

CROSS-REFERENCES TO RELATED APPLICATIONS

Not applicable.

BACKGROUND OF THE INVENTION

1. Field of the Invention

The present invention relates to an exposure value adjustment apparatus, method, and non-transitory computer readable medium thereof; more specifically, the present invention relates to an exposure value adjustment apparatus, method, and non-transitory computer readable medium that utilizes the histogram of a reference image.

2. Descriptions of the Related Art

The techniques for generating High Dynamic Range (HDR) images have been investigated in recent years, which allow an image to have a greater dynamic range between the lightest and darkest areas of the image.

Conventional HDR techniques capture several images (e.g. three images) by different exposure values and then generate an HDR image based on these images. These conventional HDR techniques have drawbacks because environment conditions have not been considered. Specifically, conventional HDR techniques have no knowledge of how much under-expose value to recover enough highlights and/or how much the over-expose value to recover enough shadows. In ideal case, if the current image is adequately exposed, a setting such as +1 EV and −1 EV (or +2 EV and −2 EV) may be good for the next image. However, this is often not the case in our real life. For example, when the current image is under-exposed, a setting of −2 EV will only complicate the problem. Likewise, when the current image is over-exposed, a setting of +2 EV will complicate the problem as well.

Consequently, the technique for generating HDR images that takes the environment conditions into consideration is still in an urgent need.

SUMMARY OF THE INVENTION

To solve the aforementioned problems, the present invention provides an exposure value adjustment apparatus, an exposure value adjustment method, and a non-transitory tangible computer readable medium thereof.

The exposure value adjustment apparatus of the present invention comprises a camera module and a processor, wherein the camera module and the processor electrically connected to each other. The camera module captures a reference image by a base exposure value. The processor generates a histogram of the reference image. Next, the processor divides the histogram into a low partial histogram, a middle partial histogram, and a high partial histogram by a first threshold and a second threshold. It is noted that the first threshold is lower than the second threshold. The processor then decides a high exposure value according to the low partial histogram and the middle partial histogram, decides a low exposure value according to the high partial histogram and the middle partial histogram, and decides a middle exposure value according to the high exposure value and the low exposure value. It is noted that the low exposure value is lower than the high exposure value and the middle exposure value is between the high exposure value and the low exposure value.

The exposure value adjustment method of the present invention is for use in an electronic device and comprises the steps of: (a) generating a histogram of a reference image, wherein the reference image is captured by a base exposure value, (b) dividing the histogram into a low partial histogram, a middle partial histogram, and a high partial histogram by a first threshold and a second threshold, wherein the first threshold is lower than the second threshold, (c) deciding a high exposure value according to the low partial histogram and the middle partial histogram, (d) deciding a low exposure value according to the high partial histogram and the middle partial histogram, wherein the low exposure value is lower than the high exposure value, and (e) deciding a middle exposure value according to the high exposure value and the low exposure value, wherein the middle exposure value is between the high exposure value and the low exposure value.

The non-transitory tangible computer readable medium of the present invention is stored with a computer program. The computer program executes an exposure value adjustment method after being loaded into an electronic apparatus. The computer program comprises code A, code B, code C, code D, and code E. The code A is for generating a histogram of a reference image, wherein the reference image is captured by a base exposure value. The code B is for dividing the histogram into a low partial histogram, a middle partial histogram, and a high partial histogram by a first threshold and a second threshold, wherein the first threshold is lower than the second threshold. The code C is for deciding a high exposure value according to the low partial histogram and the middle partial histogram. The code D is for deciding a low exposure value according to the high partial histogram and the middle partial histogram, wherein the low exposure value is lower than the high exposure value. The code E is for deciding a middle exposure value according to the high exposure value and the low exposure value.

According to the above descriptions, the technique disclosed by the present invention determines an exposure condition of a reference image by analyzing a histogram of the reference image. Afterwards, the present invention decides a low exposure value, a middle exposure value, and a high exposure value according to the determined exposure condition of the reference image. As the exposure values have been decided based on the exposure condition of the reference image, the images captured based on the low exposure value, the middle exposure value, and the high exposure value contain more details. As a result, a High Dynamic Range (HDR) image generated based on the images contains more details as well.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 2A illustrates the portions 20a, 20b, 20c in the low partial histogram 104a;

DESCRIPTION OF THE PREFERRED EMBODIMENT

In the following description, the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction.

Figure 1A:
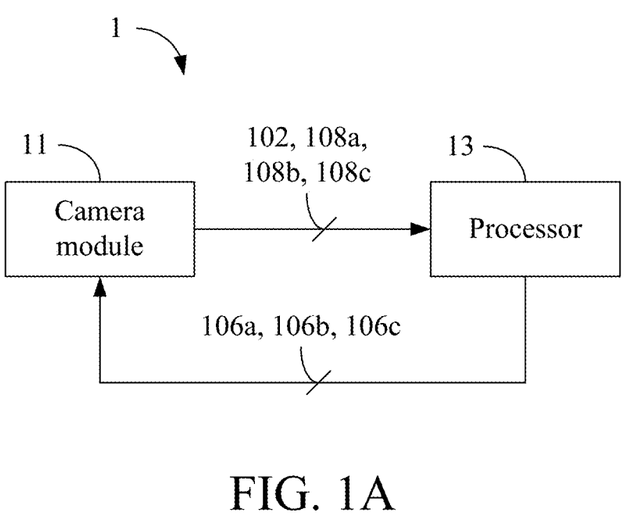
FIG. 1A illustrates the exposure value adjustment apparatus 1 of the first embodiment.

A first embodiment of the present invention is an exposure value adjustment apparatus 1 and a schematic view of which is depicted in FIG. 1A. The exposure value adjustment apparatus 1 comprises a camera module 11 and a processor 13, wherein the camera module 11 and the processor 13 electrically connected to each other. The processor 13 may be any of various processors, central processing units (CPUs), microprocessors, or other computing devices that are well-known by those of ordinary skill in the art.

Figure 1B:
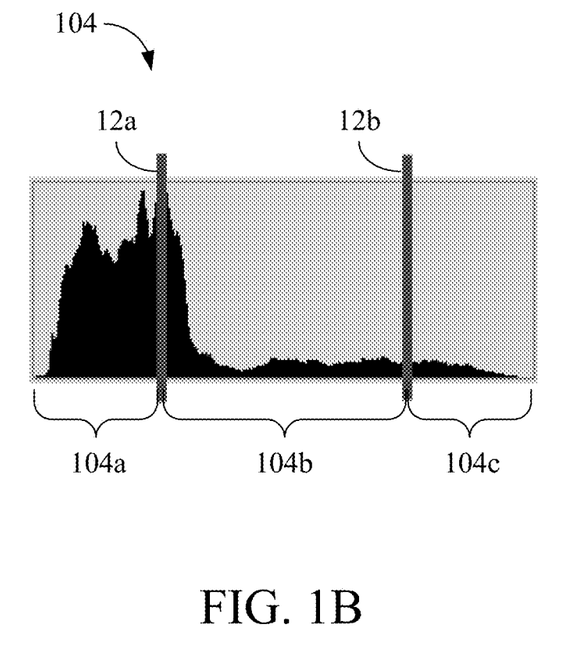
FIG. 1B illustrates the histogram 104 of the reference image 102.

In this embodiment, the camera module 11 captures a reference image 102 by a base exposure value. The reference image 102 may be a preview image and the base exposure value may be 0 EV. The processor 13 then generates a histogram 104 of the reference image 102 as shown in FIG. 1B. Next, the processor 13 divides the histogram 104 into a low partial histogram 104a, a middle partial histogram 104b, and a high partial histogram 104c by a first threshold 12a and a second threshold 12b. It is noted that the first threshold 12a is lower than the second threshold 12b. In addition, a plurality of luminance values covered by the low partial histogram 104a are below the first threshold 12a, a plurality of luminance values covered by the high partial histogram 104c are above the second threshold 12b, and a plurality of luminance values covered by the middle partial histogram 104b are between the first threshold 12a and the second threshold 12b.

Following that, the processor 13 decides a high exposure value 106c according to the low partial histogram 104a and the middle partial histogram 104b. When a number of the pixels within the low partial histogram 104a is much greater than a number of the pixels within the middle partial histogram 104b, it means that the reference image 102 was taken under-exposed. Therefore, the processor 13 decides the high exposure value 106c to be a value that is greater than the base exposure value for at least a first predetermined amount. For example, when the base exposure is 0 EV, the high exposure value 106c may be +2 EV, +3 EV, etc. On the contrary, when the number of the pixels within the low partial histogram 104a is close to the number of the pixels within the middle partial histogram 104b, it means that the reference image 102 was not taken under-exposed. Thus, the processor 13 decides the high exposure value 106c to be the base exposure value or a value that is only slightly greater than the base exposure value. It is noted that the value is smaller than the aforementioned first predetermined amount. For example, when the base exposure is 0 EV, the high exposure value 106c may be 0 EV as well or may be +0.5 EV, +1 EV, etc.

In addition, the processor 13 decides a low exposure value 106a according to the high partial histogram 104c and the middle partial histogram 104b. It is noted that the low exposure value 106a is lower than the high exposure value 106c. When a number of the pixels within the high partial histogram 104c is much greater than a number of the pixels within the middle partial histogram 104b, it means that the reference image 102 was taken over-exposed. Hence, the processor 13 decides the low exposure value 106a to be a value that is smaller than the base exposure value for at least a second predetermined amount. For example, when the base exposure is 0 EV, the low exposure value 106a may be −2 EV, −3 EV, etc. On the contrary, when the number of the pixels within the low partial histogram 104c is close to the number of the pixels within the middle partial histogram 104b, it means that the reference image 102 was not taken over-exposed. Thus, the processor 13 decides the low exposure value 106a to be the base exposure value or a value that is only slightly smaller than the base exposure value. It is noted that the value is smaller than the aforementioned second predetermined amount. For example, when the base exposure is 0 EV, the low exposure value 106a may be 0 EV as well or may be −0.5 EV, −1 EV, etc.

Next, the processor 13 decides a middle exposure value 106b according to the high exposure value 106c and the low exposure value 106a. The middle exposure value 106b is between the low exposure value 106a and the high exposure value 106c. For example, the processor 13 may take an average value of the high exposure value 106c and the low exposure value 106a to be the middle exposure value 106b.

After the low exposure value 106a, the middle exposure value 106b, and the high exposure value 106c have been decided, the camera module 11 captures an image 108a by the low exposure value 106a, an image 108b by the middle exposure value 106b, and an image 108c by the high exposure value 106c. Then, the processor 13 generates a High Dynamic Range (HDR) image by the images 108a, 108b, 108c.

According to the above descriptions, the exposure value adjustment apparatus 1 determines the exposure condition of the reference image 102 by analyzing the histogram 104 of the reference image 102 and then decides the low exposure value 106a, the middle exposure value 106b, and the high exposure value 106c according to the determined exposure condition of the reference image 102. As the exposure values have been decided based on the exposure condition of the reference image 102, the images 108a, 108b, 108c captured based on the low exposure value 106a, the middle exposure value 106b, and the high exposure value 106c contain more details. As a result, the HDR image generated based on the images 108a, 108b, 108c contains more details as well.

Please refer to FIGS. 1A, 1B, 2A, and 2B for a second embodiment of the present invention. The operations executed by the exposure value adjustment apparatus 1 in the second embodiment are similar to those in the first embodiment, so only the differences between the second embodiment and the first embodiment will be detailed. Specifically, the main differences between the second embodiment and the first embodiment are the operations/ processes for deciding the low exposure value 106a and the high exposure value 106c.

Figure 2A:
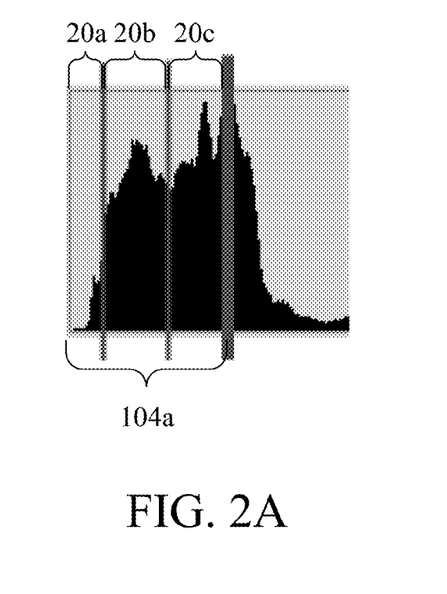

Particularly, the processor 13 calculates a first ratio by dividing the number of the pixels within the low partial histogram 104a by the number of the pixels within the middle partial histogram 104b. Next, the processor 13 determines whether the first ratio is greater than a first predetermined threshold. When the first ratio is not greater than the first predetermined threshold, it means that the reference image 102 was not taken under-exposed. Hence, the processor 13 decides the high exposure value 106c to be the base exposure value or a value that is only slightly greater than the base exposure value. On the contrary, when the first ratio is greater than the predetermined threshold, it means that the reference image 102 was taken under-exposed. In the situation that the reference image 102 was taken under-exposed, the processor 13 further divides the low partial histogram 104a into a plurality portions 20a, 20b, 20c as shown in FIG. 2A, wherein each of the portions 20a, 20b, 20c corresponds to an exposure value greater than the base exposure value. The processor 13 then assigns the high exposure value 106c to be the exposure value that corresponds to the portion with the greatest number of pixels. For example, when the base exposure is 0 EV, the exposure values correspond to the portions 20a, 20b, 20c may be +4 EV, +3 EV, +2 EV, etc. Among the portions 20a, 20b, 20c, the portion 20b has the greatest number of pixels. Hence, the processor assigns the high exposure value 106c to be +3 EV.

Figure 2B:
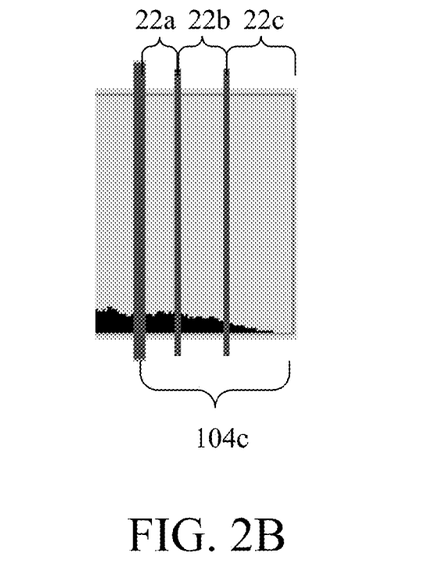
FIG. 2B illustrates the portions 22a, 22b, 22c in the high partial histogram 104c.

Similarly, the processor 13 calculates a second ratio by dividing the number of the pixels within the high partial histogram 104c by the number of the pixels within the middle partial histogram 104b. Next, the processor 13 determines whether the second ratio is greater than a second predetermined threshold. When the second ratio is not greater than the second predetermined threshold, it means that the reference image 102 was not taken over-exposed. Hence, the processor 13 decides the low exposure value 106a to be the base exposure value or a value that is only slightly smaller than the base exposure value. On the contrary, when the second ratio is greater than the second predetermined threshold, it means that the reference image 102 was taken over-exposed. In the situation that the reference image 102 was taken over-exposed, the processor 13 further divides the high partial histogram 104c into a plurality portions 22a, 22b, 22c as shown in FIG. 2B, wherein each of the portions 22a, 22b, 22c corresponds to an exposure value smaller than the base exposure value. The processor 13 then assigns the low exposure value 106a to be the exposure value that corresponds to the portion with the greatest number of pixels. For example, when the base exposure is 0 EV, the exposure values correspond to the portions 22a, 22b, 22c may be −2 EV, −3 EV, −4 EV, etc. Among the portions 22a, 22b, 22c, the portion 22a has the greatest number of pixels. Hence, the processor assigns the low exposure value 106a to be −2 EV.

After the low exposure value 106a and the high exposure value 106c have been decided, the middle exposure value 106b can be decided as well. Afterwards, the images 108a, 108b, 108c are captured based on the low exposure value 106a, the middle exposure value 106b, and the high exposure value 106c and a HDR image can be generated.

In other embodiments, when the first ratio is greater than the first predetermined threshold, the processor 13 may decide the high exposure value 106c by considering all the exposure values correspond to the portions 20a, 20b, 20c, such as weighting these exposure values according to the number of the pixels within the portions 20a, 20b, 20c. Likewise, when the second ratio is greater than the second predetermined threshold, the processor 13 may decide the low exposure value 106a by considering all the exposure values correspond to the portions 22a, 22b, 22c, such as weighting these exposure values according to the number of the pixels within the portions 22a, 22b, 22c.

From the above descriptions, it is learned that the second embodiment determines whether the reference image 102 was taken under-exposed and/or over-exposed more specifically. In addition, the low partial histogram 104a is divided into portions 20a, 20b, 20c that correspond to various exposure values greater than the base exposure value, so the high exposure value 106c can be determined more accurately by considering the luminance distribution of the pixel in the low partial histogram 104a. Likewise, the high partial histogram 104c is divided into portions 22a, 22b, 22c that correspond to various exposure values smaller than the base exposure value, so the low exposure value 106a can be determined more accurately by considering the luminance distribution of the pixel in the high partial histogram 104c. As the low exposure value 106a, the middle exposure value 106b, and the high exposure value 106c are decided more accurately, the resultant HDR image contains more details.

Figure 3:
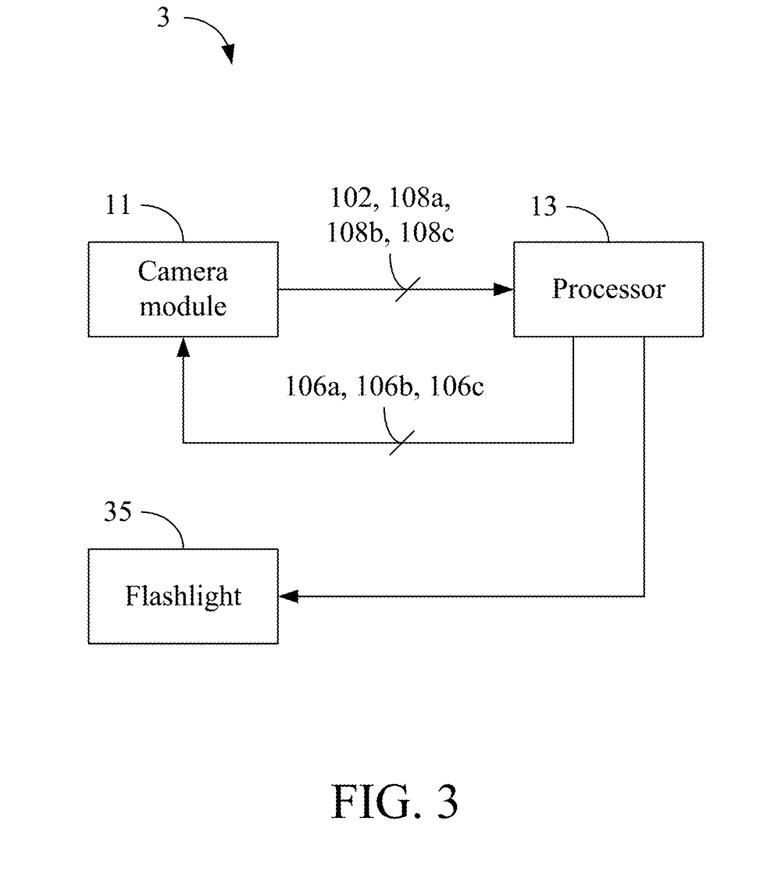
FIG. 3 illustrates the exposure value adjustment apparatus 3 of the third embodiment.

A third embodiment of the present invention is an exposure value adjustment apparatus 3 and a schematic view of which is depicted in FIG. 3. The exposure value adjustment apparatus 1 comprises a camera module 11, a processor 13, and a flashlight 35, wherein the processor 13 is electrically connected to the camera module 11 and the flashlight 35. The camera module 11 and the processor 13 comprised in the exposure value adjustment apparatus 3 perform similar operations as those comprised in the exposure value adjustment apparatus 1 of the first and second embodiments. Hence, the following descriptions will be focused on the additional operations performed by the exposure value adjustment apparatus 3.

In the third embodiment, the low exposure value 106a and the high exposure value 106c will be further fine-tuned before being used for deciding the middle exposure value 106b. Specifically, the processor 13 further determines whether the high exposure value 106c is greater than a predetermined exposure value. In other words, the processor 13 determines whether the backlight is strong and/or whether the main object in the reference image 102 is dark. If the high exposure value 106c is greater than the predetermined exposure value, it means that the backlight is strong and/or the main object in the reference image 102. Thus, the processor 13 increases the high exposure value 106c by a predetermined value, such as increasing the high exposure value 106c by +0.5 EV.

In addition, the processor 13 determines whether an average luminance value of the reference image 102 is smaller than a predetermined luminance value. That is, the processor 13 determines whether the environment is in the condition of low light. If the average luminance value of the reference image 102 is smaller than a predetermined luminance value, it means that the environment is in the condition of low light. Therefore, the processor 13 increases the low exposure value 106a by a predetermined value. For example, the processor 13 may change the low exposure value 106a from −2 EV to −1 EV. After the low exposure value 106a and the high exposure value 106c have been fine-tuned, the processor 13 then decides the middle exposure value 106b.

Next, the camera module 11 captures the image 108b by the middle exposure value 106b and the image 108c by the high exposure value 106c. If either the high exposure value 106c or the low exposure value 106a has been fine-tuned, the processor 13 turns on the flashlight 35 and then the camera module 11 captures the image 108a by the low exposure value 106a when the flashlight 35 is on. Otherwise, the camera module 11 captures the image 108a by the low exposure value 106a without the flashlight 35 being tuned on.

With the technique provided by the third embodiment, even in the condition of low environment light and/or strong backlight, the images 108a, 108b, 108c captured based on the low exposure value 106a, the middle exposure value 106b, and the high exposure value 106c still contain enough details. As a result, the HDR image generated based on the images 108a, 108b, 108c still contains enough details.

Figure 4A:
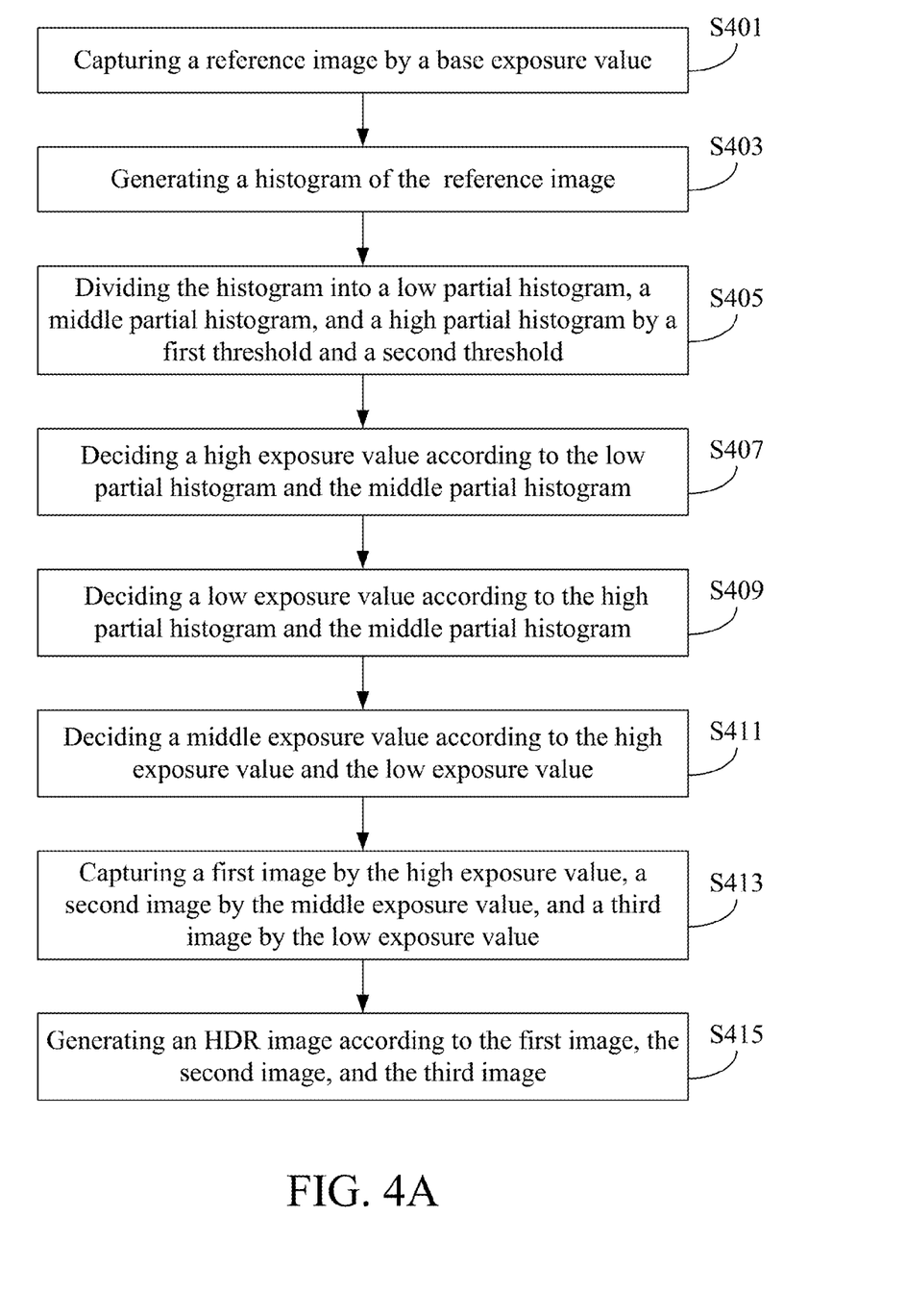
FIG. 4A illustrates the flowchart of the exposure value adjustment method of the fourth embodiment.

A fourth embodiment of the present invention is an exposure value adjustment method for use in an electronic device, such as the exposure value adjustment apparatuses 1. A flowchart of the exposure value adjustment method is illustrated in FIG. 4A.

First, step S401 is executed by a camera module of the electronic device to capture a reference image by a base exposure value. In other embodiments, if an electronic device does not equipped with a camera module, step S401 will be replaced by a step of receiving a reference image captured by a base exposure value. Next, step S403 is executed by a processor of the electronic device to generate a histogram of the reference image. Following that, step S405 is executed by the processor to divide the histogram into a low partial histogram, a middle partial histogram, and a high partial histogram by a first threshold and a second threshold, wherein the first threshold is lower than the second threshold.

The exposure value adjustment method then executes step S407 for deciding a high exposure value according to the low partial histogram and the middle partial histogram by the processor. Subsequently, step S409 is executed by the processor for deciding a low exposure value according to the high partial histogram and the middle partial histogram, wherein the low exposure value is lower than the high exposure value. It is noted that the order for executing steps S407 and S409 can be changed. Afterwards, step S411 is executed by the processor for deciding a middle exposure value according to the high exposure value and the low exposure value, wherein the middle exposure value is between the high exposure value and the low exposure value.

Next, step S413 is executed by the camera module for capturing a first image by the high exposure value, a second image by the middle exposure value, and a third image by the low exposure value. Finally, step S415 is executed by the processor for generating an HDR image according to the first image, the second image, and the third image.

Figure 4B:
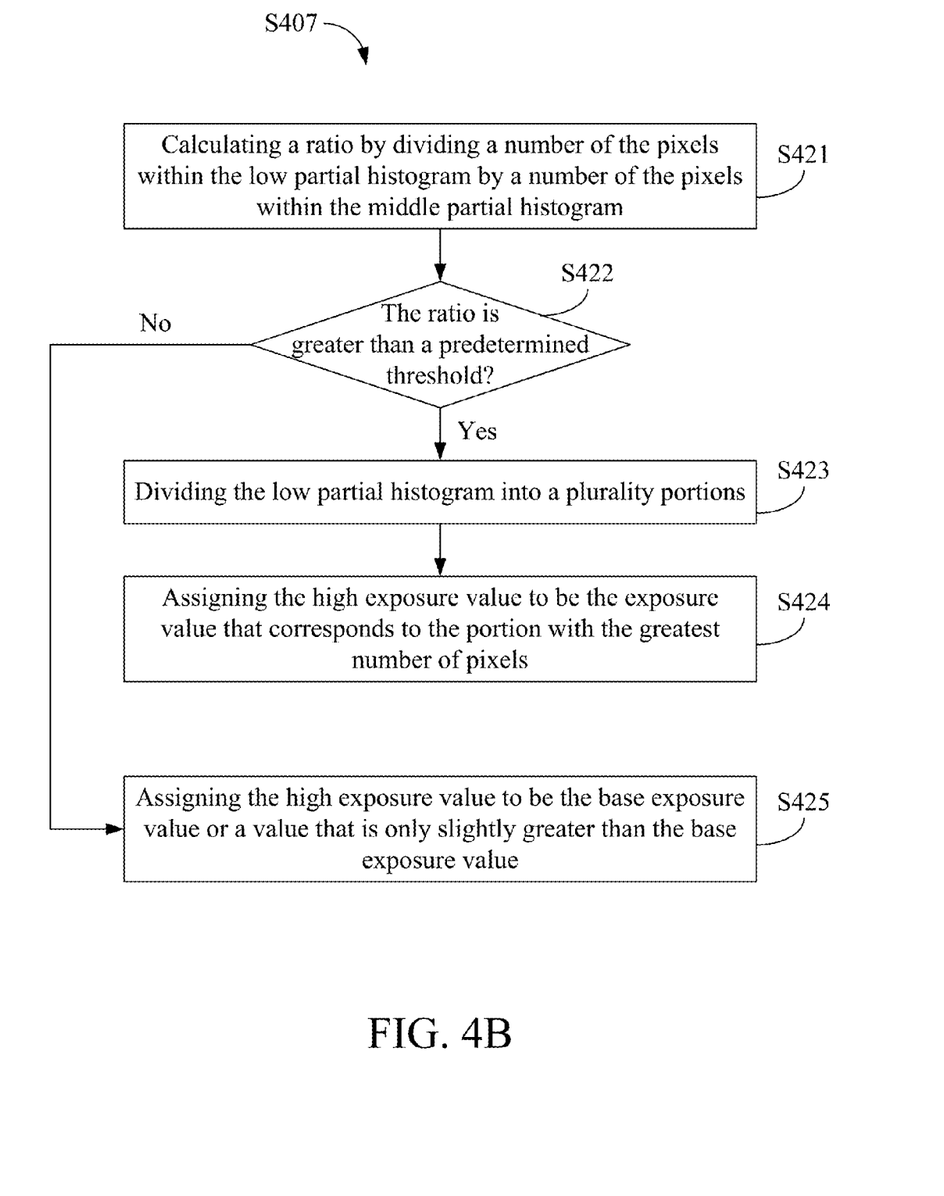
FIG. 4B illustrates the flowchart of the step S407.

In some embodiments, the aforementioned step S407 may be realized by the steps shown in the flowchart of FIG. 4B. First, step S421 is executed by the processor for calculating a ratio by dividing a number of the pixels within the low partial histogram by a number of the pixels within the middle partial histogram. Next, step S422 is executed by the processor to determiner whether the ratio is greater than a predetermined threshold. If the ratio is greater than the predetermined threshold, step S423 is executed by the processor for dividing the low partial histogram into a plurality portions, wherein each of the portions corresponding to an exposure value greater than the base exposure value. Following that, step S424 is executed by the processor for assigning the high exposure value to be the exposure value that corresponds to the portion with the greatest number of pixels. If the ratio is not greater than the predetermined threshold, step S425 is then executed by the processor for assigning the high exposure value to be the base exposure value or a value that is only slightly greater than the base exposure value.

Figure 4C:
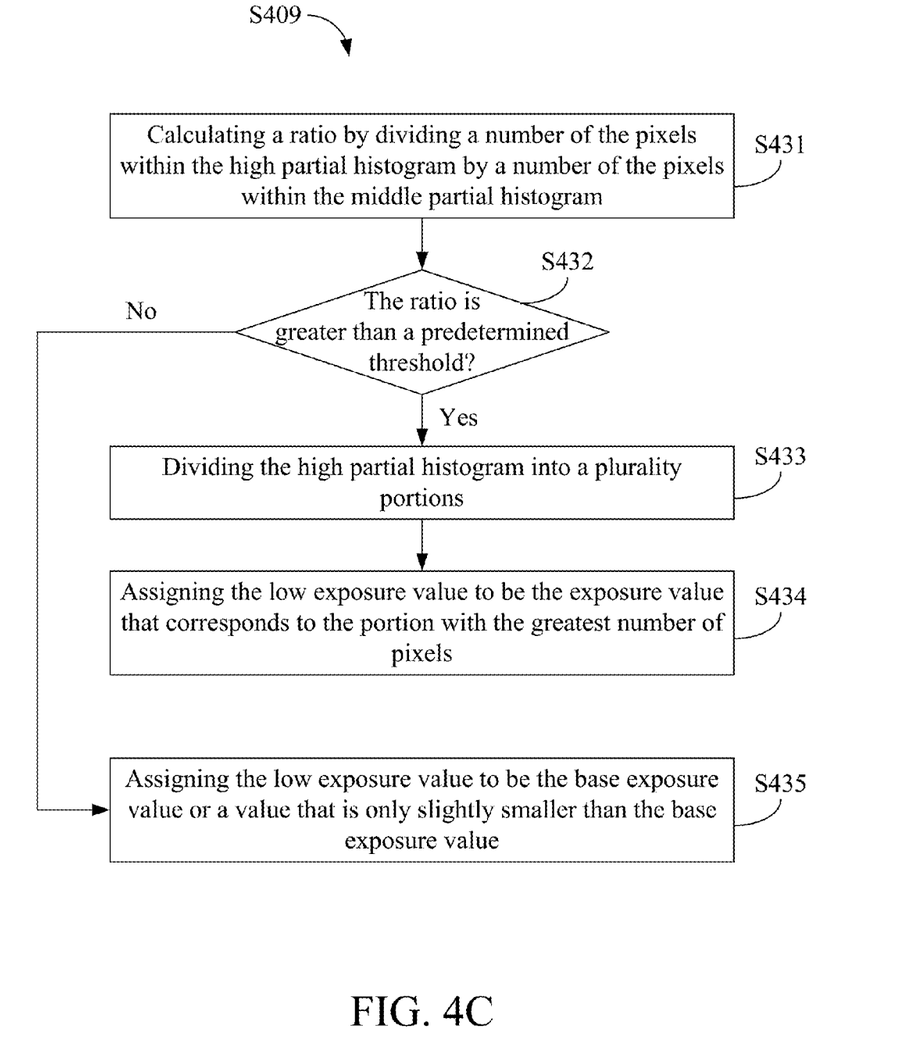
FIG. 4C illustrates the flowchart of the step S409.

In some embodiments, the aforementioned step S409 may be realized by the steps shown in the flowchart of FIG. 4C. First, step S431 is executed by the processor for calculating a ratio by dividing a number of the pixels within the high partial histogram by a number of the pixels within the middle partial histogram. Next, step S432 is executed by the processor to determiner whether the ratio is greater than a predetermined threshold. If the ratio is greater than the predetermined threshold, step S433 is executed by the processor for dividing the high partial histogram into a plurality portions, wherein each of the portions corresponding to an exposure value smaller than the base exposure value. Following that, step S434 is executed by the processor for assigning the low exposure value to be the exposure value that corresponds to the portion with the greatest number of pixels. If the ratio is not greater than the predetermined threshold, step S435 is then executed by the processor for assigning the low exposure value to be the base exposure value or a value that is only slightly smaller than the base exposure value.

In addition to the aforesaid steps, the fourth embodiment can execute all the operations and functions set forth for the exposure value adjustment apparatus 1 in the first and second embodiments. How the fourth embodiment executes these operations and functions will be readily appreciated by those of ordinary skill in the art based on the explanation of the first and the second embodiments, and thus will not be further described therein.

Figure 5A:
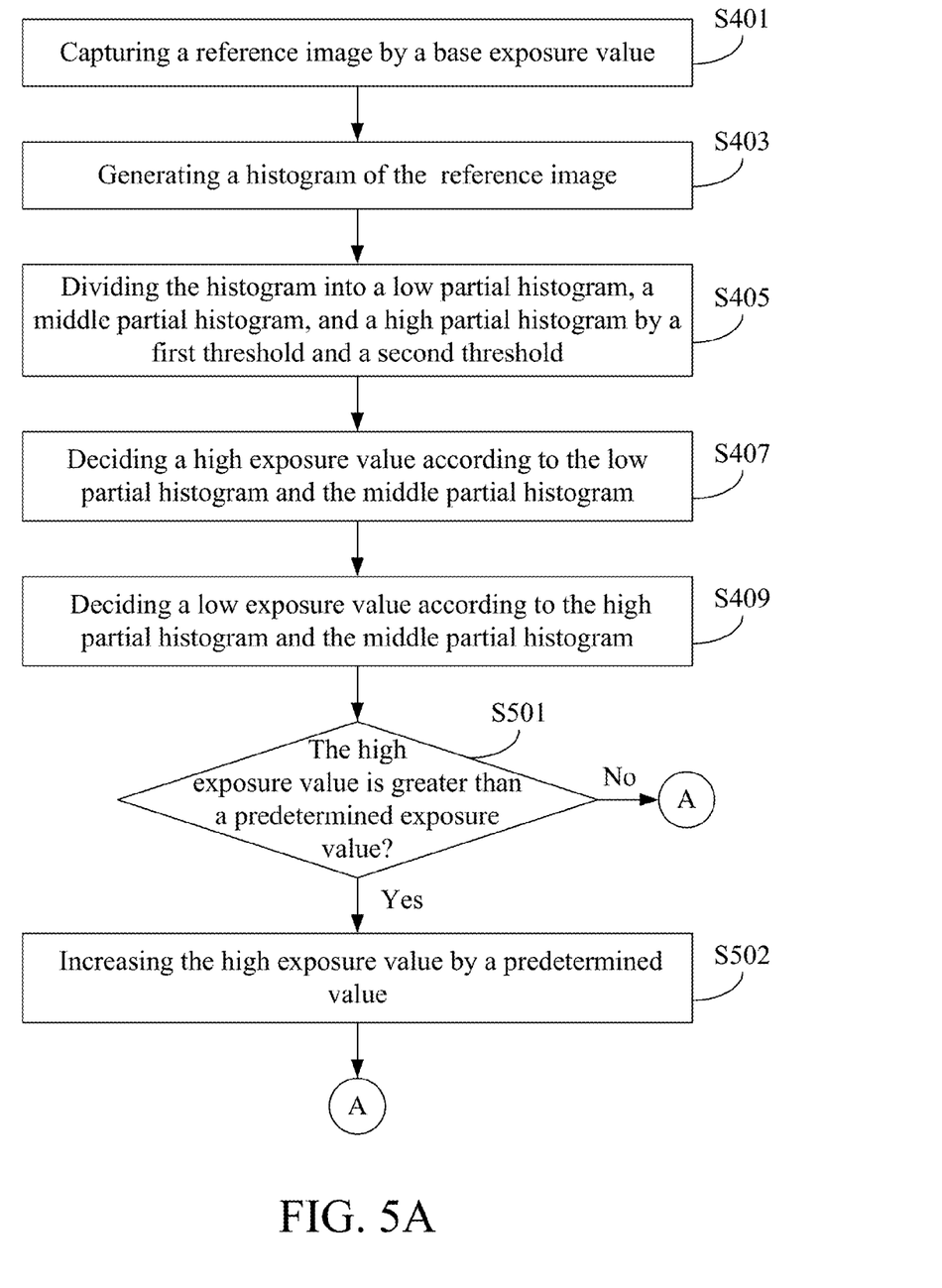
FIGS. 5A and 5B illustrate the flowchart of the exposure value adjustment method of the fifth embodiment.
Figure 5B:
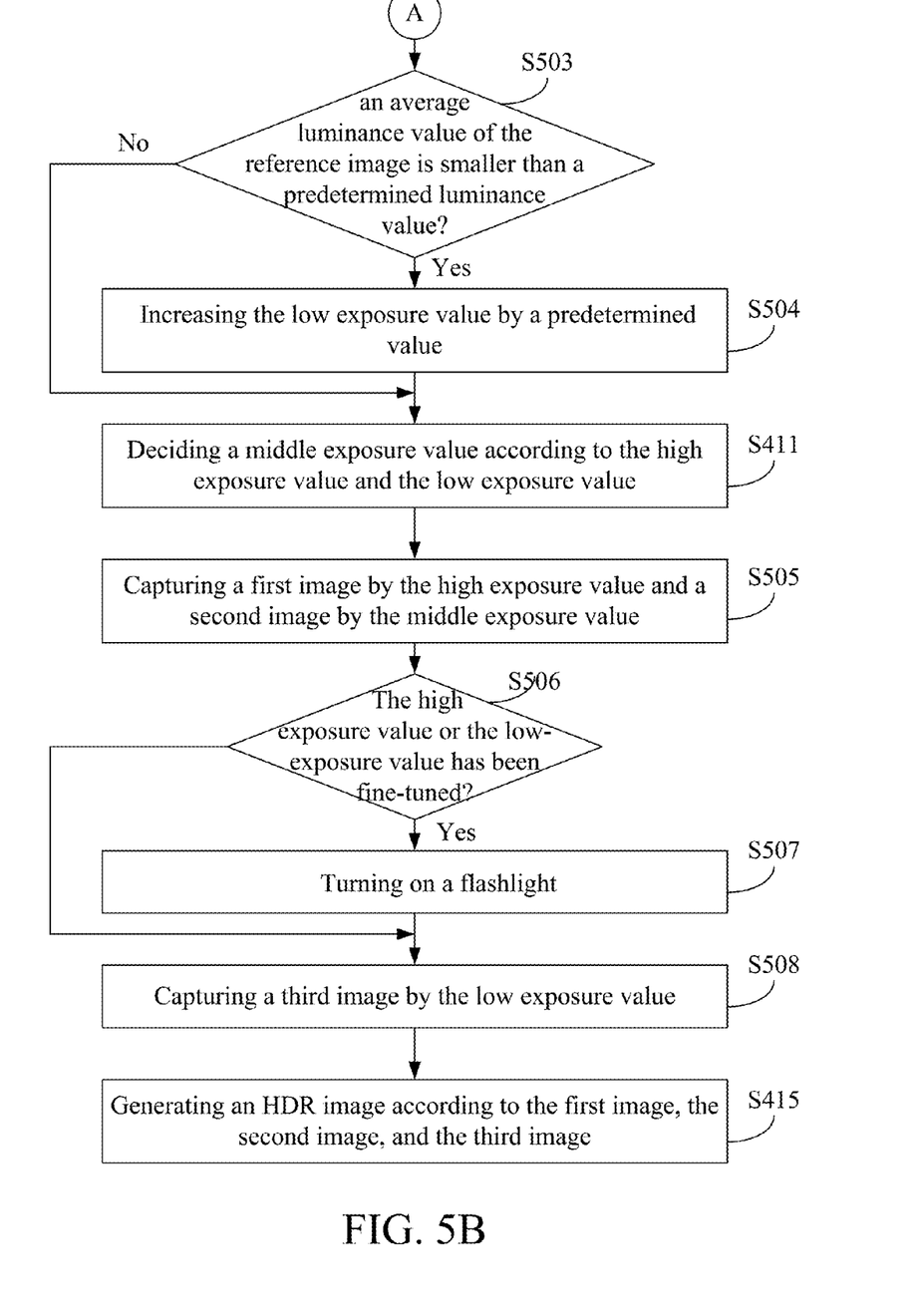

A fifth embodiment of the present invention is an exposure value adjustment method for use in an electronic device, such as the exposure value adjustment apparatuses 3. A flowchart of the exposure value adjustment method is illustrated in FIGS. 5A and 5B.

First, the exposure value adjustment method executes steps S401, S403, S405, S407, and S409. Since these steps have been elaborated in the fourth embodiment, they are not detailed again here. Following that, step S501 is executed by the processor for determining whether the high exposure value is greater than a predetermined exposure value (i.e. whether the backlight is too strong or whether the main object in the reference image is too dark). If the high exposure value is greater than the predetermined exposure value, step S502 is then executed by the processor for increasing the high exposure value by a predetermined value. Afterwards, step S503 is executed by the processor. If determination in the step S501 is no, then the method executes step S503 directly.

In step S503, the processor determines whether an average luminance value of the reference image is smaller than a predetermined luminance value (i.e. whether the environment is in the condition of low light). If it is yes, step S504 is executed by the processor for increasing the low exposure value by a predetermined value. After step S504, step S411 is executed. If step S503 determines that the average luminance value of the reference image is not smaller than a predetermined luminance value, the step S411 is executed directly. Following that, step S505 is executed by the camera module for capturing a first image by the high exposure value and a second image by the middle exposure.

Next, step S506 is executed for determining whether the high exposure value has been fine-tuned in step S502 or the low-exposure value has been fine-tuned in step S504. If it is yes, then step S507 is executed by the processor to turn on a flashlight of the electronic device and step S508 is executed by the camera module for capturing a third image by the low exposure value. If the determination result is no in step S506, step S508 is executed directly. Afterwards, step S415 is executed by the processor for generating an HDR image according to the first image, the second image, and the third image.

In addition to the aforesaid steps, the fifth embodiment can execute all the operations and functions set forth for the exposure value adjustment apparatus 3 in the third embodiment. How the fifth embodiment executes these operations and functions will be readily appreciated by those of ordinary skill in the art based on the explanation of the third embodiment, and thus will not be further described therein.

The exposure value adjustment methods of the fourth and fifth embodiments may be implemented by a computer program which is stored in a non-transitory tangible machine-readable medium. When the computer program is loaded into an electronic device, a plurality of codes comprised in the computer program will be executed by the electronic device to accomplish all the steps described in the fourth and fifth embodiments. This non-transitory tangible machine-readable medium may be a common electronic device, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the above descriptions, the technique disclosed by the present invention determines an exposure condition of a reference image by analyzing a histogram of the reference image. Afterwards, the present invention decides a low exposure value, a middle exposure value, and a high exposure value according to the determined exposure condition of the reference image. As the exposure values have been decided based on the exposure condition of the reference image, the images captured based on the low exposure value, the middle exposure value, and the high exposure value contain more details. As a result, the HDR image generated based on the images contains more details as well.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An exposure value adjustment apparatus, comprising:
  a camera module, being configured to capture a reference image by a base exposure value; and
  a processor, being electrically connected to the camera module and configured to generate a histogram of the reference image, divide the histogram into a low partial histogram, a middle partial histogram, and a high partial histogram by a first threshold and a second threshold, calculate a first ratio by a number of the pixels within the low partial histogram and a number of the pixels within the middle partial histogram, decide a high exposure value according to the first ratio, calculate a second ratio by a number of the pixels within the high partial histogram and the number of the pixels within the middle partial histogram, decide a low exposure value according to the second ratio, and decide a middle exposure value according to the high exposure value and the low exposure value.

2. The exposure value adjustment apparatus of claim 1, wherein the first threshold is lower than the second threshold, the low exposure value is lower than the high exposure value, and the middle exposure value is between the high exposure value and the low exposure value.

3. The exposure value adjustment apparatus of claim 1, wherein the processor calculates the first ratio by dividing the number of the pixels within the low partial histogram by the number of the pixels within the middle partial histogram, determines that the first ratio is greater than a predetermined threshold, the processor divides the low partial histogram into a plurality portions, each of the portions corresponds to an exposure value greater than the base exposure value, and the processor assigns the high exposure value to be the exposure value that corresponds to the portion with the greatest number of pixels.

4. The exposure value adjustment apparatus of claim 1, wherein the processor calculates the first ratio by dividing the number of the pixels within the low partial histogram by the number of the pixels within the middle partial histogram, determines that the first ratio is smaller than a predetermined threshold and assigns the high exposure value to be the base exposure value.

5. The exposure value adjustment apparatus of claim 1, wherein the processor calculates the second ratio by dividing the number of the pixels within the high partial histogram by the number of the pixels within the middle partial histogram, determines that the second ratio is greater than a predetermined threshold, the processor divides the high partial histogram into a plurality portions, each of the portions corresponds to an exposure value lower than the base exposure value, and the processor assigns the low exposure value to be the exposure value that corresponds to the portion with the greatest number of pixels.

6. The exposure value adjustment apparatus of claim 1, wherein the processor calculates the second ratio by dividing the number of the pixels within the high partial histogram by the number of the pixels within the middle partial histogram, determines that the second ratio is smaller than a predetermined threshold and assigns the low exposure value to be the base exposure value.

7. The exposure value adjustment apparatus of claim 1, wherein the processor further determines that the high exposure value is greater than a predetermined exposure value and increases the high exposure value by a predetermined value.

8. The exposure value adjustment apparatus of claim 7, further comprising:
  a flashlight,
    wherein the camera module further captures a first image by the high exposure value and captures a second image by the middle exposure value, the processor further turns on the flashlight, and the camera module further captures a third image by the low exposure value when the flashlight is on.

9. The exposure value adjustment apparatus of claim 1, wherein the processor further determines that an average luminance value of the reference image is smaller than a predetermined luminance value and increases the low exposure value by a predetermined value.

10. The exposure value adjustment apparatus of claim 9, further comprising:
a flashlight,
wherein the camera module further captures a first image by the high exposure value and captures a second image by the middle exposure value, the processor further turns on the flashlight, and the camera module further captures a third image by the low exposure value when the flashlight is on.

11. An exposure value adjustment method for use in an electronic device, comprising the following steps of:
(a) generating, by a processor, a histogram of a reference image, wherein the reference image is captured by a base exposure value;
(b) dividing, by the processor, the histogram into a low partial histogram, a middle partial histogram, and a high partial histogram by a first threshold and a second threshold, wherein the first threshold is lower than the second threshold;
(c) calculating, by the processor, a first ratio by a number of the pixels within the low partial histogram and a number of the pixels within the middle partial histogram;
(d) deciding, by the processor, a high exposure value according to the first ratio;
(e) calculating, by the processor, a second ratio by a number of the pixels within the high partial histogram and the number of the pixels within the middle partial histogram; and
(f) deciding, by the processor, a low exposure value according to the second ratio.

12. The exposure value adjustment method of claim 11, further comprising the following steps of:
deciding, by the processor, a middle exposure value according to the high exposure value and the low exposure value, wherein the middle exposure value is between the high exposure value and the low exposure value.

13. The exposure value adjustment method of claim 11, further comprising the steps of:
capturing, by a camera module, the reference image by the base exposure value.

14. The exposure value adjustment method of claim 11, wherein the step (c) calculates the first ratio by dividing the number of the pixels within the low partial histogram by the number of the pixels within the middle partial histogram and the step (d) comprises the steps of:
determining, by the processor, that the first ratio is greater than a predetermined threshold;
dividing, by the processor, the low partial histogram into a plurality portions, each of the portions corresponding to an exposure value greater than the base exposure value; and
assigning, by the processor, the high exposure value to be the exposure value that corresponds to the portion with the greatest number of pixels.

15. The exposure value adjustment method of claim 11, wherein the step (c) calculates the first ratio by dividing the number of the pixels within the low partial histogram by the number of the pixels within the middle partial histogram and the step (d) comprises the steps of:
determining, by the processor, that the first ratio is smaller than a predetermined threshold; and
assigning, by the processor, the high exposure value to be the base exposure value.

16. The exposure value adjustment method of claim 11, wherein the step (e) calculates the second ratio by dividing the number of the pixels within the high partial histogram by the number of the pixels within the middle partial histogram and the step (f) comprises the steps of:
determining, by the processor, that the second ratio is greater than a predetermined threshold;
dividing, by the processor, the high partial histogram into a plurality portions, each of the portions corresponding to an exposure value lower than the base exposure value; and
assigning, by the processor, the low exposure value to be the exposure value that corresponds to the portion with the greatest number of pixels.

17. The exposure value adjustment method of claim 11, wherein the step (e) calculates the second ratio by dividing the number of the pixels within the high partial histogram by the number of the pixels within the middle partial histogram and the step (f) comprises the steps of:
determining, by the processor, that the second ratio is smaller than a predetermined threshold; and
assigning, by the processor, the low exposure value to be the base exposure value.

18. The exposure value adjustment method of claim 11, further comprising the steps of:
determining, by the processor, that the high exposure value is greater than a predetermined exposure value; and
increasing, by the processor, the high exposure value by a predetermined value.

19. The exposure value adjustment method of claim 18, further comprising the following steps of:
capturing, by the camera module, a first image by the high exposure value;
capturing, by the camera module, a second image by the middle exposure value;
turning on, by the processor, a flashlight; and
capturing, by the camera module, a third image by the low exposure value when the flashlight is on.

20. The exposure value adjustment method of claim 11, further comprising the steps of:
determining, by the processor, that an average luminance value of the reference image is smaller than a predetermined luminance value; and
increasing, by the processor, the low exposure value by a predetermined value.

21. The exposure value adjustment method of claim 20, further comprising the following steps of:
capturing, by the camera module, a first image by the high exposure value;
capturing, by the camera module, a second image by the middle exposure value;
turning on, by the processor, a flashlight; and
capturing, by the camera module, a third image by the low exposure value when the flashlight is on.

22. A non-transitory tangible computer readable medium, being stored with a computer program, the computer program executing an exposure value adjustment method after being loaded into an electronic apparatus, and the computer program comprising:
a code A for generating a histogram of a reference image, wherein the reference image is captured by a base exposure value;
a code B for dividing the histogram into a low partial histogram, a middle partial histogram, and a high partial histogram by a first threshold and a second threshold, wherein the first threshold is lower than the second threshold;

a code C for calculating a first ratio by a number of the pixels within the low partial histogram and a number of the pixels within the middle partial histogram;

a code D for deciding a high exposure value according to the first ratio;

a code E for calculating a second ratio by a number of the pixels within the high partial histogram and the number of the pixels within the middle partial histogram;

a code F for deciding a low exposure value according to the second ratio; and a code G for deciding a middle exposure value according to the high exposure value and the low exposure value.

\* \* \* \* \*